United States Patent [19]

Khan

[11] Patent Number: 5,448,681
[45] Date of Patent: Sep. 5, 1995

[54] INTELLIGENT CONTROLLER WITH NEURAL NETWORK AND REINFORCEMENT LEARNING

[75] Inventor: Emdadur R. Khan, San Jose, Calif.
[73] Assignee: National Semiconductor Corporation, Santa Clara, Calif.
[21] Appl. No.: 859,328
[22] Filed: Mar. 27, 1992
[51] Int. Cl.⁶ .......................................... G06F 15/18
[52] U.S. Cl. ...................................... 395/11; 395/22; 395/906; 395/907; 364/152
[58] Field of Search ........................... 395/11, 22–24, 395/27, 906, 907; 364/152

[56] References Cited

U.S. PATENT DOCUMENTS

| | | | |
|---|---|---|---|
| 4,563,746 | 1/1986 | Yoshida et al. | 395/906 |
| 5,058,180 | 10/1991 | Khan | 395/22 |
| 5,142,612 | 8/1992 | Sheirik | 395/11 |
| 5,175,797 | 12/1992 | Funabashi et al. | 395/22 |
| 5,195,172 | 3/1993 | Elad et al. | 395/11 |
| 5,201,026 | 4/1993 | Tsuiki | 395/11 |
| 5,235,339 | 8/1993 | Morrison et al. | 395/11 |
| 5,239,593 | 8/1993 | Wittner et al. | 395/11 |
| 5,276,771 | 1/1994 | Manukian et al. | 395/11 |
| 5,351,200 | 9/1994 | Impink, Jr. | 395/907 |

OTHER PUBLICATIONS

Demetri Psaltis and Athanasius sideris and Alan A. Yamamura; "A Multi-Layered Neural Network Controller"; IEEE Control Systems Magazine; Apr. '88, pp. 18–21.
Allon Guez, James L. Eilbert, and Moshe Kam; "Neural Network Architecture for Control"; IEEE Control Systems Magazine; Apr. 88; pp. 22–25.
Sutton et al, "Reinforcement learning is direct adaptive optimal control"; IEEE Control Systems Magazine, vol. 12, iss. 2, pp. 19–22, Apr. 1992.
Werbos, "An overview of Neural Networks for Control"; IEEE Control Systems Magazine, vol. 11, iss. 1, pp. 40–41, Jan. 1991.
Werbos, "Neural networks for control and system identification"; Proceedings of the 28th IEEE Conference on Decision and Control, pp. 260–265 vol. 1, 13–15 Dec. 1989.
Jameson, "A Neurocontroller based on model feedback and the adaptive heuristic critic"; IJCNN, vol. 2, pp. 37–44, 17–21 Jun. 1990.
Lin et al, "CMAC-based adaptive critic self-learning control"; IEEE Transactions on Neural Networks, vol. 2, iss. 5, pp. 530–533, Sep. 1991.
C. W. Anderson, "Strategy Learning with Multi Layer Connectionist Representations", TR87–509.3, May 17, 1988 (corrected version of report published in Proceedings of the Fourth International Workshop on Machine Learning, Irvine, Calif., 1987), pp. 1–12.
Hamid R. Berenji, "Refinement of Approximate Reasoning Based Controllers by Reinforcement Learning", Machine Learning: Proceedings of the Eighth International Workshop, Jun. 27–29, 1991.
D. Rumelhart et al., "Learning Internal Representations by Error Back Propagation", In D. Rumelhart & J. McCelland (Eds.), Parallel Distributed Processing: Explorations in the Microstructures of Cognition, vol. 1, pp. 318–362, MIT Press, 1986.
W. T. Miller, III, et al., (Eds.) "Neural Networks for Control", pp. 37–47 and 67–87, MIT Press, 1990.
J. Hertz et al., "Introduction to the Theory of Neural Computation", pp. 232–246, Addison-Wesley, 1991.
A. G. Barto et al., "Neuronlike Adaptive Elements That Can Solve Difficult Learning Control Problems", IEEE Transactions on Systems, Man and Cybernetics, SMC—13:834–846, pp. 538–546, 1983.
R. S. Sutton, "Temporal Credit Assignment in Reinforcement Learning", Ph.D. thesis, University of Massachusetts, 1984.

Primary Examiner—Allen R. MacDonald
Assistant Examiner—Tariq Hafiz
Attorney, Agent, or Firm—Limbach & Limbach; H. Donald Nelson; Richard J. Roddy

[57] ABSTRACT

A plant controller using reinforcement learning for controlling a plant includes action and critic networks with enhanced learning for generating a plant control signal. Learning is enhanced within the action network by using a neural network configured to operate according to unsupervised learning techniques based upon a Kohonen Feature Map. Learning is enhanced within the critic network by using a distance parameter which represents the difference between the actual and desired states of the quantitative performance, or output, of the plant when generating the reinforcement signal for the action network.

32 Claims, 10 Drawing Sheets

FIG. 9A $$OUTPUT = \sum_{I=1}^{M} W_{IJ} S_I - \theta_J$$

A fuzzy set with 5 elements defined as "around 10"
Universe of Discourse = {8, 9, 10, 11, 12}
Fuzzy elements = {0.7, 0.9, 1.0, 0.9, 0.7}

FIG. 12

| Linguistic Sets | Quantized Levels | | | | | | | | |
|---|---|---|---|---|---|---|---|---|---|
| | -4 | -3 | -2 | -1 | 0 | 1 | 2 | 3 | 4 |
| LP | 0 | 0 | 0 | 0 | 0 | 0 | 0 | 0.6 | 1 |
| SP | 0 | 0 | 0 | 0 | 0 | 0.6 | 1 | 0.6 | 0 |
| ZE | 0 | 0 | 0 | 0.6 | 1 | 0.6 | 0 | 0 | 0 |
| SN | 0 | 0.6 | 1 | 0.6 | 0 | 0 | 0 | 0 | 0 |
| LN | 1 | 0.6 | 0 | 0 | 0 | 0 | 0 | 0 | 0 |
| | | | | | Membership function | | | | |

INTELLIGENT CONTROLLER WITH NEURAL NETWORK AND REINFORCEMENT LEARNING

BACKGROUND OF THE INVENTION

1. Field of the Invention

The present invention relates to intelligent controllers, and in particular, to intelligent controllers employing reinforcement learning techniques.

2. Description of the Related Art

Intelligent controllers are finding increasing use today to control complex systems. For example, such a controller used for assisting servomechanism controllers is disclosed in commonly assigned U.S. patent application Ser. No. 07/585,494, entitled "Intelligent Servomechanism Controller Using a Neural Network," the specification of which is incorporated herein by reference. Further applications include control systems developed for assisting robotic mechanisms.

Refinement of intelligent controllers has been proceeding apace. One example of refinement has been the use of "approximate reasoning" based controllers, e.g. controllers using "fuzzy" logic. A second example of refinement has been the use of reinforcement learning, while a third example is the use of both approximate reasoning and reinforcement learning in combination. However, heretofore developed reinforcement learning schemes have had problems in learning and generating proper control signals, particularly for complex plants such as those typically used in robotic mechanisms.

As is known, approximate reasoning based control is a technique which applies the knowledge of human experts in developing controller rules. Such controllers generally use "fuzzy set" theory. Reinforcement learning, which has a significant role in theories of learning by animals, has been developed in the theory of learning automata and has been applied to various control applications. These two schemes have been combined under the mnemonic "ARIC" to develop approximate reasoning based controllers which can learn from experience and exhibit improved performance. However, reinforcement learning has several problems, particularly in learning and generating proper control signals.

Reinforcement learning is used in applications where the target, or desired output, state is not exactly known. For example, if properly controlled, a robot arm designed to follow a desired trajectory path will do so while requiring a minimum amount of energy. However, the necessary action, e.g. control signal, to ensure that the energy will be minimized over time is unknown, although knowledge of the desired trajectory is known. Optimal control methods might be available if a model of the plant (i.e. the robot arm) and an accurate performance measure exist. However, for a complex plant, a true model is very difficult, if not possible, to obtain. Thus, for the minimization of energy, a learning system such as a reinforcement learning based neural network is useful.

The biggest challenge of such networks is how to link present action, e.g. generation of control signals, with future consequences or effects. Either reinforcement or supervised learning can be used in designing the controller for the robot arm to cause it to follow the proper trajectory when a target or desired output is known. However, supervised learning would be more efficient compared to reinforcement learning, since the learning takes a great deal of time in networks using the latter.

A reinforcement learning based controller is capable of improving performance of its plant, as evaluated by a measure, or parameter, whose states can be supplied to the controller. Although desired control signals which lead to optimal plant performance exist, the controller cannot be programmed to produce these exact signals since the true, desired outputs are not known. Further, the primary problem is to determine these optimal control signals, not simply to remember them and generalize therefrom.

Accordingly, the task of designing a reinforcement learning based controller can be divided into two parts. First, a critic network must be constructed which is capable of evaluating the performance of the subject plant in a way which is both appropriate to the actual control objective, and informative enough to allow learning. Second, it must be determined how to alter the outputs of the controller to improve the performance of the subject plant, as measured by the critic network.

Figure 1:
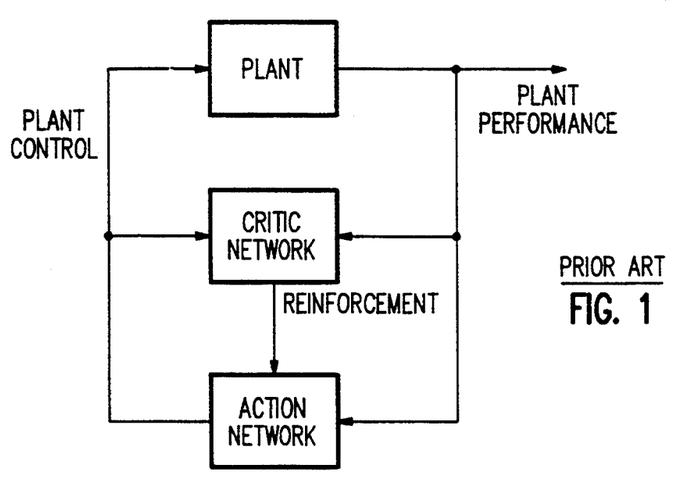
FIG. 1 is a block diagram of a controller and plant system using a conventional reinforcement learning based controller.

Referring to FIG. 1, a conventional reinforcement learning based control system includes a plant (e.g. robotic mechanism), an action network and a critic network, connected substantially as shown. A plant performance signal output by the plant and indicative of the performance of the plant is received by both the critic and action networks. The action network provides a plant control signal for controlling the plant. The critic network receives both the plant performance and plant control signals, and provides a reinforcement signal to the action network indicating how well the plant is performing as compared to the desired plant performance. Further discussions of reinforcement learning based systems can be found in *Neural Networks for Control*, pp. 36–47 (W. T. Miller III, R. S. Sutton & P. J. Werbos, eds., MIT Press, 1990), and H. R. Berenji, *Refinement of Approximate Reasoning-based Controllers by Reinforcement Learning*, Machine Learning: Proceedings of the Eighth International Workshop, Evanston, Ill., Jun. 27-29, 1991.

The conventional reinforcement learning based system of FIG. 1 can be broadly classified into two groups. The first group uses a critic network which is capable of providing an immediate evaluation of the plant's performance which is appropriate to the actual control objective. The gradient of the reinforcement signal as a function of the plant control signal is determined. The intent is to learn a model of the process by which the plant control signals lead to reinforcement signals. The controllers which fall within this group use heuristic dynamic programming ("HDP"), a back-propagated adaptive critic ("BAC"), dual heuristic dynamic programming ("DHP"), or globalized DHP.

In the second group, the space of plant control signal outputs is explored by modifying the plant control signals and observing how the reinforcement signal changes as a result. This is basically a trial and error way of learning, such as that studied by a psychologist in which behavior is selected according to its consequences in producing reinforcement. The theory of learning automata also falls within this category. Other types of controllers which fall within this group include an associative search network, or associative reward-penalty network, and adaptive heuristic critic ("AHC"). (Yet a third group includes a controller using back propagation through time ["BTT"]).

Figure 2:
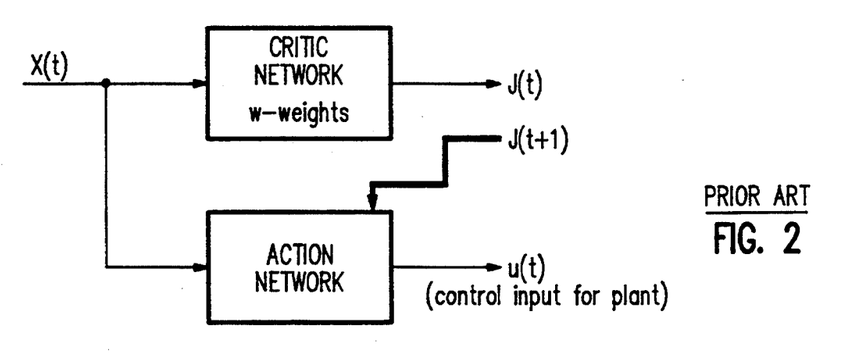
FIG. 2 is a block diagram of a conventional adaptive critic network.

Referring to FIG. 2, a controller using heuristic dynamic programming uses adaptation in the evaluation, or critic, network only. The output signal J(t) of the critic network is a function of the input signal X(t) and its internal weights W, wherein the input signal X(t) comprises the plant performance signal. Intuitively, it can be seen that it would be desireable to make the output signal J(t) of the critic network an accurate representation of "how good" the plant performance is, as indicated by the plant performance signal X(t). To do this, the critic network must be trained by either adjusting its weights W after each pattern, or after passing the whole pattern set (i.e. batch learning). Some sort of supervised learning, such as back propagation, is needed for such learning. However, a problem exists in that the target is not known. Thus, before we begin adaptation of the weights W during a particular pass, we must plug in the next value of the input signal X(t), i.e. X(t+1), into the critic network using the old weights in order to calculate the target for each time period t, or pattern.

Figure 3:
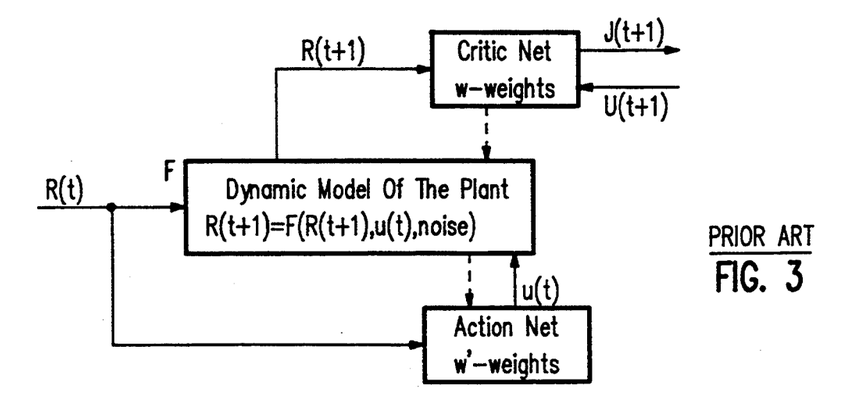
FIG. 3 is a block diagram of a conventional back propagated adaptive critic network.

Referring to FIG. 3, a back propagated adaptive critic adapts the weights of the action network. To do this, back propagation is used to compute the derivatives of the reinforcement signal J(t) with respect to the weights of the action network. The weights are then changed using standard back propagation, i.e. back propagating through the critic network to the plant model and to the action network, as indicated by the dashed lines. This type of controller is unsatisfactory because of the need for plant model. For a complex system, it is difficult if not impossible, to get a realistic model. If there is a sudden, unexpected event, the system must wait for a change in its model before responding.

To overcome the limitations of the back propagated adaptive critic network, a controller using dual heuristic programming was developed. It is very similar to a controller using heuristic dynamic programming, except for the targets. This type of critic network has multiple outputs and has a basic block diagram similar to that shown in FIG. 3. Further this type of critic network is a "derivative type" in that it calculates the values of the targets by using the derivatives of the reinforcement signal J(t) with respect to the plant performance signal R. Here, back propagation is used as a way to get the targets, not as a way to adapt the network to match the target. However, this type of controller works only with a linear plant model, and learning takes place only within the critic network. Moreover, this type of controller uses only the value of a single output signal J(t) to evaluate all aspects of performance, thereby causing learning to be slow and not robust. Further discussion of the foregoing controllers can be found in *Neural Networks for Control*, pp. 67-87 (W. T. Miller III, R. S. Sutton & P. J. Werbos, eds., MIT Press, 1990).

A controller which operates in accordance with the theory of learning automata probabilistically selects end outputs control signals from among a finite set of possible control signals, and updates its probabilities on the basis of evaluative feedback. This approach is effective when the evaluation process is still stochastic, e.g. for nonassociative learning, and the task is to maximize the expected value of the reinforcement signal. This approach can be used for associative learning by using a lookup table stored with data representing the requisite mappings. However, limitations of these types of controllers include the fact that such learning is only an approximation and may not be stable.

Figure 4:
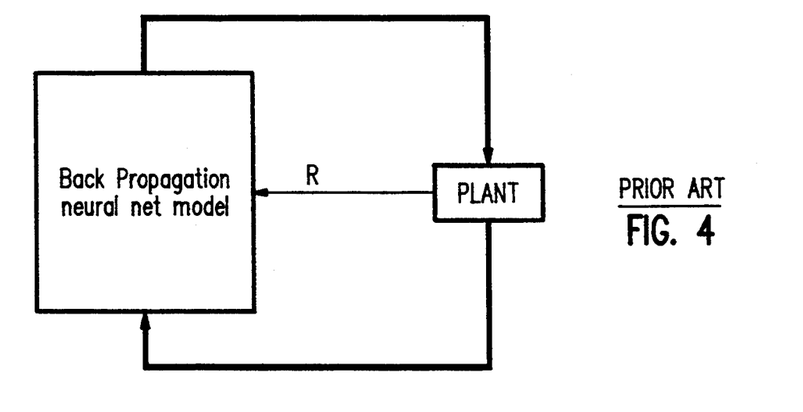
FIG. 4 is a block diagram of a controller and plant system using a conventional associative reward-penalty network.

Referring to FIG. 4, a controller using an associative reward-penalty network using learning which is based upon the expected value of the output. However, a controller of this type requires much learning time, and such learning is not robust.

Figure 5:
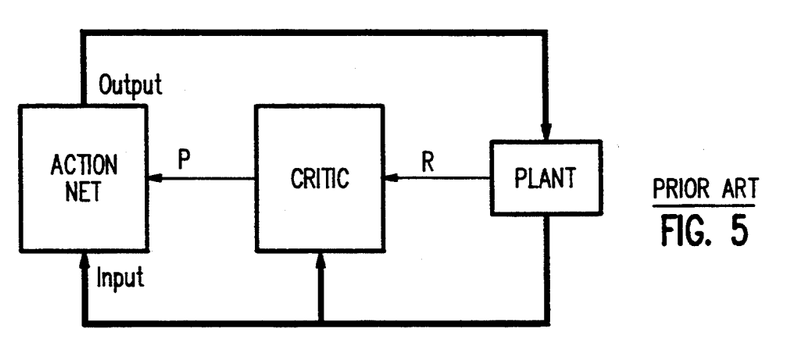
FIG. 5 is a block diagram of a system using a conventional adaptive heuristic critic network.

Referring to FIG. 5, a controller using an adaptive heuristic critic network relies on both its critic network and action network. This type of controller develops an evaluation function whose value V for a given state is a prediction of future discounted failure signals. Changes in V due to problem state transitions are combined with a failure signal R to form R'. For all states except those corresponding to failure, R=0 and R' is just the difference between the successive values of V, i.e. a prediction of failure. This scheme is used to teach the critic network. This is basically supervised learning.

Such supervised learning cannot be used for the action net, however, because correct actions are not known. Hence, the output layer is modified in a way that increases the probability of an action that is followed by a positive value of R, and decreases the probability of an action followed by a negative R. The changing probability is proportional to the magnitude of R' and to the difference between the action and expected value of the action. Thus, the result of the unusual actions have more impact on the weight adjustments than to other actions. Back propagation is used to change the weights of the first layer. Further discussion of this technique can be found in C. W. Anderson, *Strategy Learning With Multilayer Connectionist Representations*, Proceedings of the Fourth International Workshop On Machine Learning (corrected version of report), Irvine, Calif., 1987, pp. 1-12. However, a problem with this type of controller lies in the use of supervised learning, since the actual target for the action network output units are not known. Further, the learning in the critic network takes place mainly during failure, making learning very slow.

Figure 6:
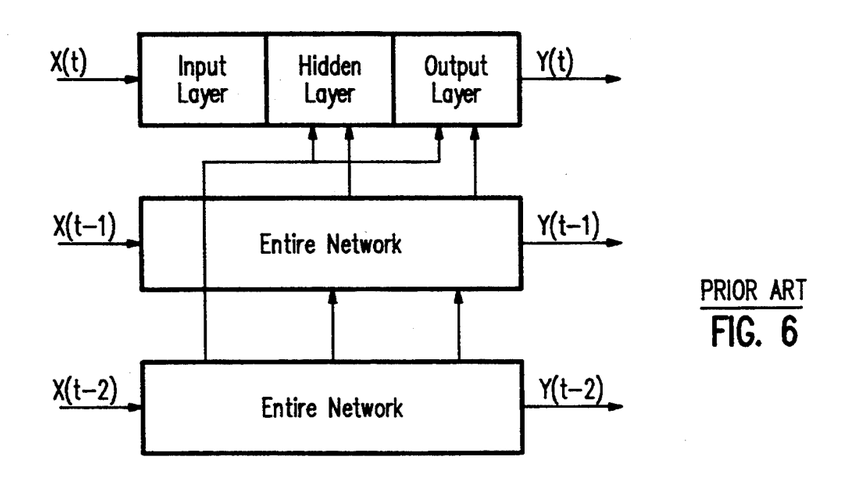
FIG. 6 is a block diagram of a conventional controller using back propagation through time.

Referring to FIG. 6, a controller using back propagation through time provides another approach to link between present action and future consequences, or to link between the present output and previous inputs. This type of controller has memory of previous time periods, and uses time derivatives of the weights, in addition to regular derivatives used in the back propagated term in a back propagated neural network. However, this type of controller does not have provisions for handling noise in the model of the plant, and is not suitable for real-time learning.

Accordingly, it would be desireable to have an intelligent controller with an improved reinforcement learning scheme, i.e. with critic and action networks having improved learning capabilities.

SUMMARY OF THE INVENTION

A controller in accordance with the present invention uses reinforcement learning for controlling a plant by generating a plant control signal. An action network receives a plant state signal and a reinforcement signal, and in accordance therewith generates a plant control signal for controlling the subject plant. The plant state signal represents the actual state of a quantitative plant performance parameter for the plant, and the reinforcement signal represents a desired state of a control performance parameter for the action network. The plant control signal represents a desired state of the quantitative plant performance parameter. A critic network coupled to the action network receives the plant state signal and a plant performance signal, and in accordance therewith generates the reinforcement signal for the action network. The plant performance signal represents a qualitative plant performance parameter for the plant.

In accordance with a preferred embodiment of the present invention, the action network generates the plant control signal in accordance with unsupervised learning. In further accordance with a preferred embodiment of the present invention, the critic network generates the reinforcement signal in accordance with a distance parameter which represents the difference between the actual state and the desired, or target, state of the quantitative plant performance parameter.

These and other features and advantages of the present invention will be understood upon consideration of the following detailed description of the invention and the accompanying drawings.

DETAILED DESCRIPTION OF THE INVENTION

Figure 7:
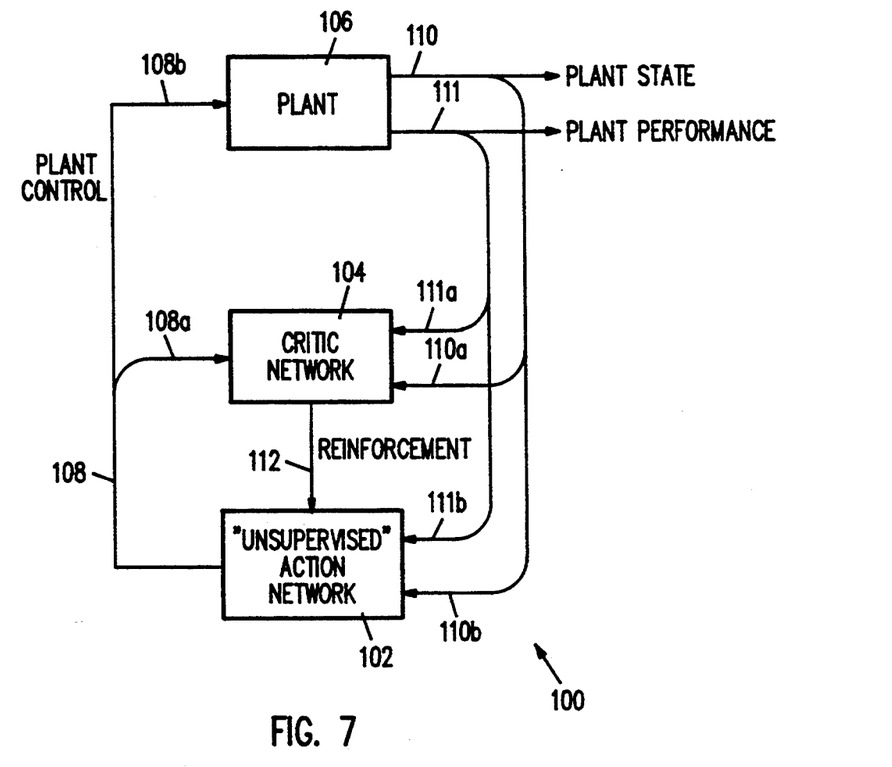
FIG. 7 is a block diagram of a controller and plant system using a controller in accordance with the present invention.

Referring to FIG. 7, a plant control system 100 using a controller in accordance with the present invention includes an "unsupervised" action network 102, a critic network 104 and a plant 106 (e.g. robotic mechanism), connected substantially as shown. The unsupervised action network 102 provides a plant control signal 108 for controlling the plant 106 and providing control feedback information to the critic network 104. The plant 106 provides a state signal 110 and a performance signal 111 which are received as state and performance feedback information, respectively, by the unsupervised action network 102 and critic network 104. The state signal 110 represents the state of a quantitative plant performance parameter (e.g. current draw, motor speed, temperature, etc.). The performance signal 111 represents a selected qualitative plant performance parameter (e g "good/bad", "successful/failure", etc) As discussed further below, the critic network 104, in selective accordance with the received plant state signal 110a ("$X_I$") and plant performance signal 111a ("R"), provides a reinforcement signal 112 ("$\overline{R}$") to the unsupervised action network 102.

Figure 8A:
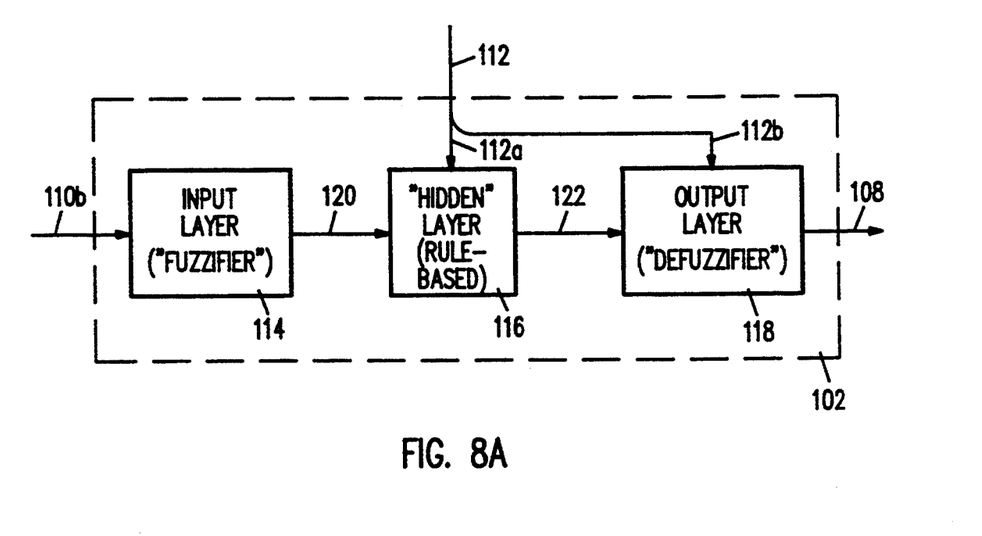
FIG. 8A is block diagram of the action network of FIG. 7.

Referring to FIG. 8A, an unsupervised action network 102 in accordance with the present invention comprises a three-layer neural network (which can be configured to operate according to "fuzzy" logic rules as discussed further below). The network 102 includes an input layer 114 ("fuzzifier" if mapped to fuzzy logic), a "hidden" layer 116 (rule-based if mapped to fuzzy logic) and an output layer 118 ("defuzzifier" if mapped to fuzzy logic), connected substantially as shown. The input layer 114 receives the plant state signal 110b and provides a signal 120 to the hidden layer 116. The hidden layer 116 receives the signal 120 and weight adjustment signals 112a.J, where $J \in \{1,2,3,\ldots,N\}$ (via the reinforcement signal 112), and in accordance therewith provides a signal 122. The output layer 118 receives this signal 122 and weight adjustment signals 112b.K, where $K \in \{1,2,3,\ldots,P\}$ (via the reinforcement signal 112), and in accordance therewith provides the plant control signal 108.

Figure 8B:
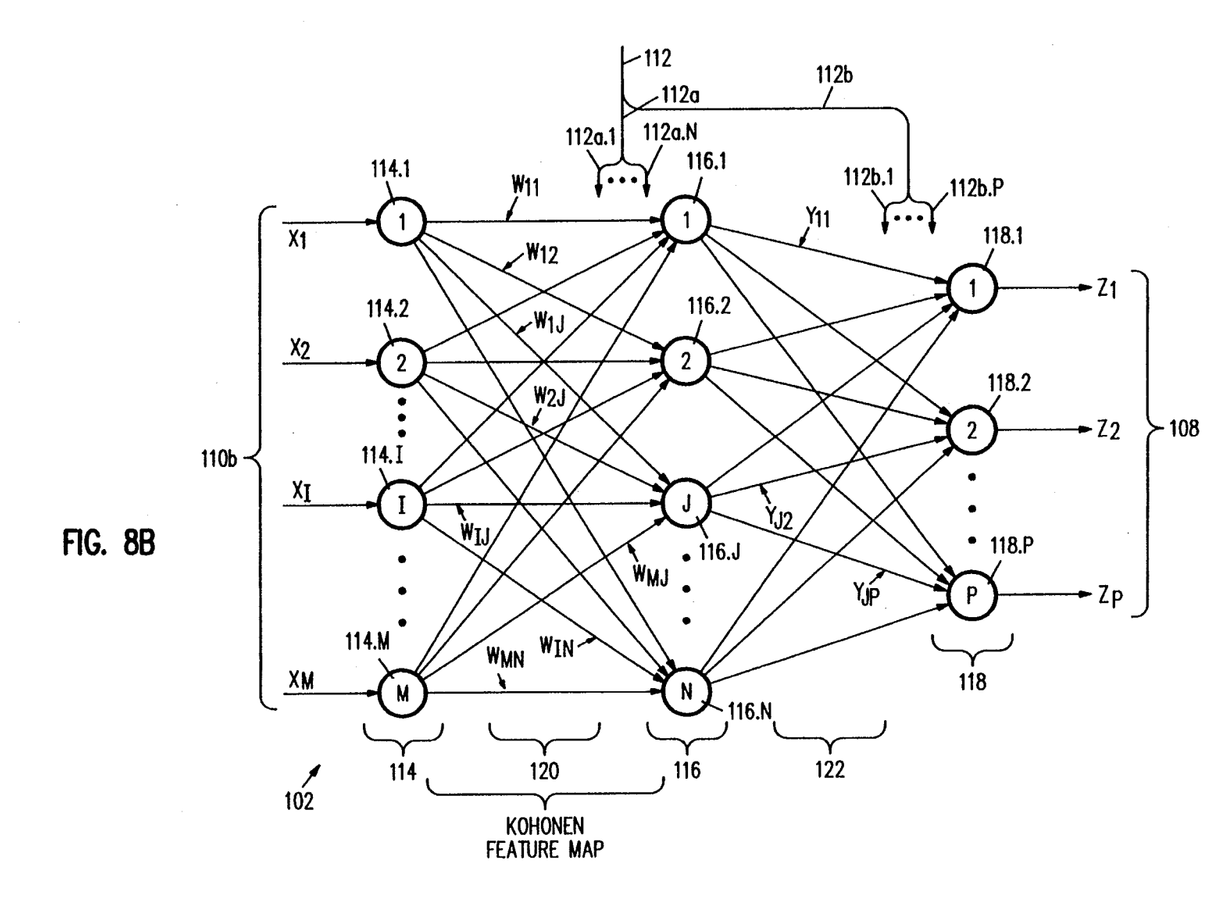
FIG. 8B is a neural network model for the action network of FIG. 8A.

Referring to FIG. 8B, the unsupervised action network 102 of FIG. 8A can be depicted as shown, using artificial neuron symbols. The input 114 and hidden 116 neuron layers together comprise a Kohonen Feature Map, and the output neuron layer 118 provides conflict resolution and defuzzification if mapped to fuzzy logic. The plant state signal 110b is fed to the input neurons 114.1-114.M within the input layer 114. The outputs from each of the input layer neurons 114.1-114.M are coupled into each of the hidden layer neurons 116.1-116.N after being appropriately "weighted" by their respective "weights" $W_{IJ}$, where $I \in \{1,2,3,\ldots,M\}$ and $J \in \{1,2,3,\ldots,N\}$. The outputs of the hidden layer neurons 116.1-116.N are passed to the output layer neurons 118.1-118.P, after being weighted by their respective weights $Y_{JK}$, where $J \in \{1,2,3,\ldots,N\}$ and $K \in \{1,2,3,\ldots,P\}$.

As discussed above, the action network 102 uses an unsupervised learning scheme based on a Kohonen Feature Map (See J. Hertz, A. Krogh & R.G. Palmer, *Introduction to the Theory of Neural Computation*, pp. 232–46 Addison-Wesley, 1991). The Kohonen Feature Map is used for the unsupervised learning. With this type of neural network, the weights of the winning neuron are changed, along with the weights of the neurons closely adjacent thereto, substantially in accordance with:

$$\Delta W_{IJ} = \eta[NF_1(J,J^*)(V_I - W_{IJ})]$$

-continued where:

$\Delta W_{IJ}$ = change in weight $W_{IJ}$ between input layer neuron $I$ and middle layer neuron $J$
$\eta$ = learning rate
$NF_1(J,J^*)$ = a neighborhood function for middle neuron layer as associated with $W_{IJ}$
 = $(\bar{R})\exp[-(J-J^*)^2]/2\sigma_1^2$
$J$ = the "Jth" neuron for which the neighborhood function is being computed
$J^*$ = the "winning" neuron
$V_I$ = output of input layer neuron $I$ (e.g. $V_I = X_I$)
$\sigma_1$ = neighborhood width parameter It should be noted that the weights are matched with the input. When enough input patterns are applied, the weights $W_{IJ}$ between the input 114 and middle 116 neuron layers are adjusted in accordance with the "neighborhood function" $NF_1$ such that for each input state only one middle layer neuron 116$b$.J will "win" and its neighboring neurons 116$b$.J-X, 116$b$.J+X (where X $\in \{1,2,3,\ldots\}$) will have successively smaller outputs. As discussed further below, the neighborhood function is adjusted in accordance with the reinforcement signal 112 from the critic network 104. For the weights $Y_{JK}$ between the middle 116 and output 118 neuron layers, weight adjustments are substantially in accordance with:

$$\Delta Y_{JK} = \eta[NF_2(J,J^*)V_J V_K]$$

where:

$\Delta Y_{JK}$ = change in weight $Y_{JK}$ between middle layer neuron $J$ and output layer neuron $K$
$NF_2(J,J^*)$ = a neighborhood function for middle neuron layer as associated with $Y_{JK}$
 = $(\bar{R})\exp[-(J-J^*)^2]/2\sigma_2^2$
$J$ = the "Jth" neuron for which the neighborhood function is being computed
$J^*$ = the "winning" neuron
$V_K$ = output of output layer neuron $K$
$\sigma_2$ = neighborhood width parameter The foregoing relationships for modifying the weights $W_{IJ}$, $Y_{JK}$ are based upon the assumption that the signals $V_I$ and the weights $W_{IJ}$ are in their normalized forms. As should be known, if the signals $V_I$ and the weights $W_{IJ}$ are not in their normalized forms, then the number $J^{x*}$ of the winning neuron is that which corresponds to the result of $MIN(V_I - W_{IJ})$ for all $J$, where $J \in \{1,2,3,\ldots,N\}$.

Reinforcement learning then modifies $\bar{R}$ to incorporate more knowledge. The weights $Y_{JK}$ between the middle 116 and output 118 neuron layers are expressed as a function of another neighborhood function $NF_2$.

Typically, the learning rate $\eta$ and neighborhood width parameters $\sigma_1$, $\sigma_2$ decrease monotonically over time (e.g.: $\eta = e^{-at}$ or $1/t$; $\sigma_1 = a\text{-}bt$; and $\sigma_2 = c\text{-}dt$; where $\alpha$, a, b, c and d are scale factors, and t is time).

It should be noted that the learning taking place for the weights $Y_{JK}$ between the middle 116 and output 118 neuron layers is according to Hebbian learning.

Thus, the plant control signal 108 is dependent not only upon the winning neuron, but also upon its neighboring neurons. Learning in both neuron layers' weights $W_{IJ}$ and $Y_{JK}$ depends upon the reinforcement signal 112 from the critic network 104. To make the plant control signal 108 a continuous signal, rather than a binary signal, the output neuron layer 118 learns and generates continuous output signals instead of binary output signals.

Figure 9A:
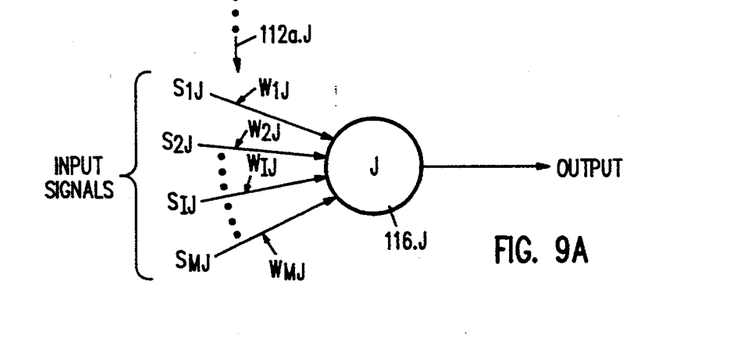
FIG. 9A is a simplified artificial neuron symbol representative of each neuron of FIG. 8B.
Figure 9B:
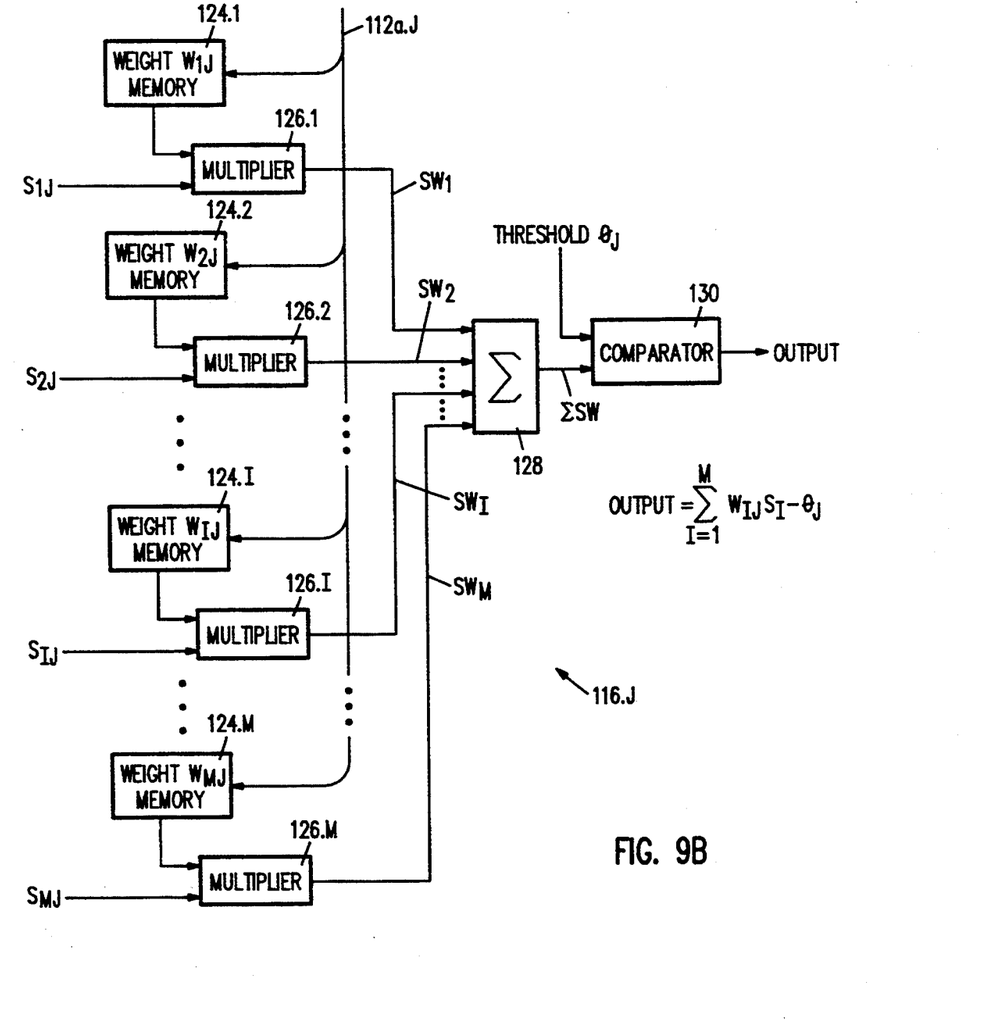
FIG. 9B is a block diagram of an exemplary electronic circuit implementation of the artificial neuron of FIG. 9A.

Referring to FIGS. 9A and 9B, the operation and construction of an artificial neuron can be better understood. FIG. 9A illustrates an artificial neuron 116.J from the middle neuron layer 116. Its input signals $S_{1J}$-$S_{MJ}$, weighted by their respective weights $W_{1J}$-$W_{MJ}$, are received by the neuron 116.J. The weights $W_{IJ}$ receive a weight adjustment signal 112$a$.J for selectively altering the weights $W_{1J}$-$W_{MJ}$.

FIG. 9B illustrates an exemplary circuit configuration for constructing the artificial neuron 116.J of FIG. 9A. The input signals $S_{1J}$-$S_{MJ}$ are inputted to multiplier circuits 126.1-126.M for multiplication with their respective weights $W_{1J}$-$W_{MJ}$, which are stored in weight memories 124.1-124.M. The weights $W_{1J}$-$W_{MJ}$ stored in these memories 124.1-124.M can be selectively modified, or adjusted, in accordance with a weight adjustment signal 112$a$.J. The resulting products $SW_1$-$SW_M$ are summed in an adder 128. The sum $\Sigma SW$ is compared against a threshold $\theta_J$ in a comparator 130 to produce the final output. Thus, the output signal represents that portion of the weighted sum of its input signals which exceeds the threshold $\theta_J$.

Figure 10A:
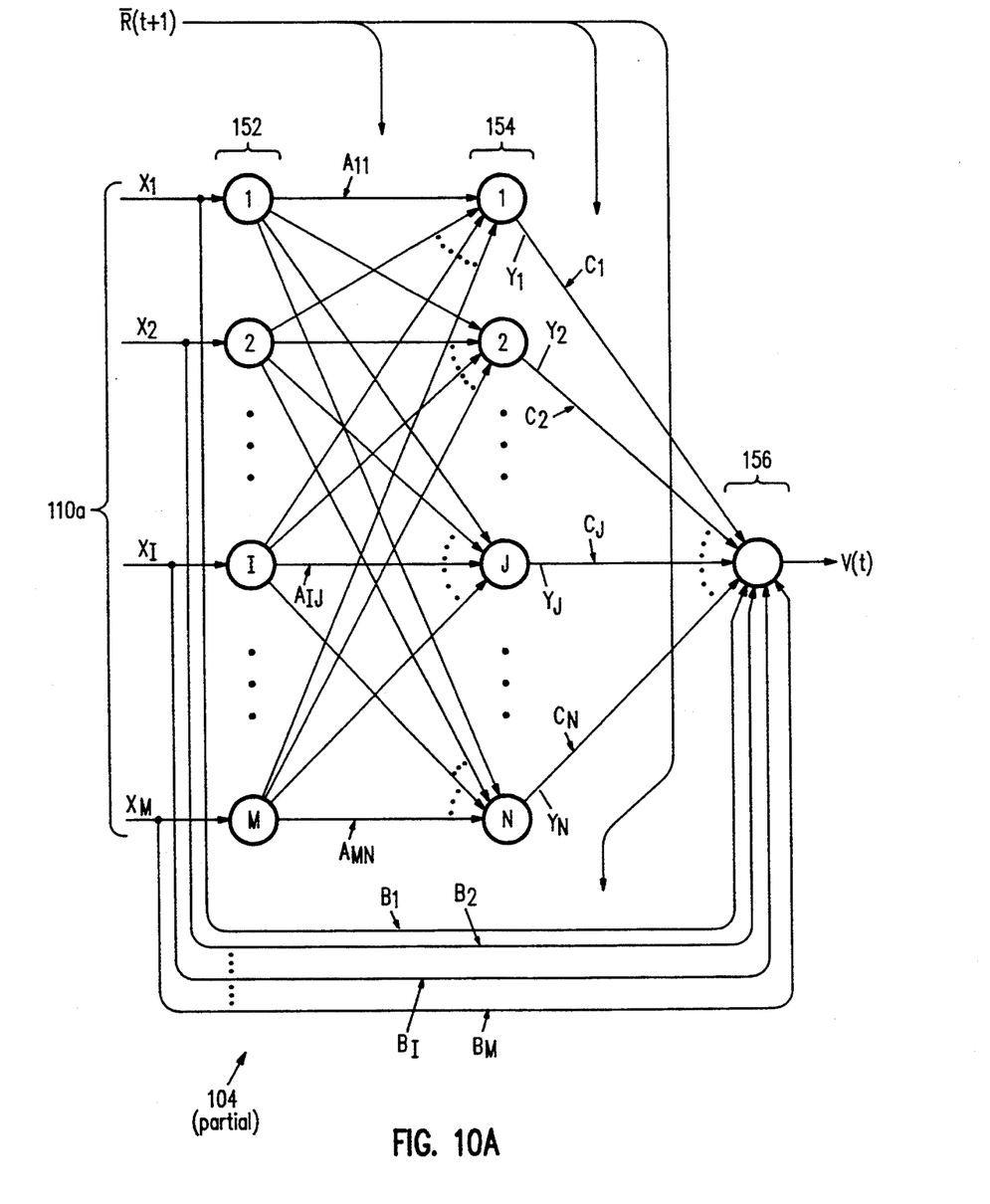
FIG. 10A is a neural network model for a portion of the critic network of FIG. 7.
Figure 10B:
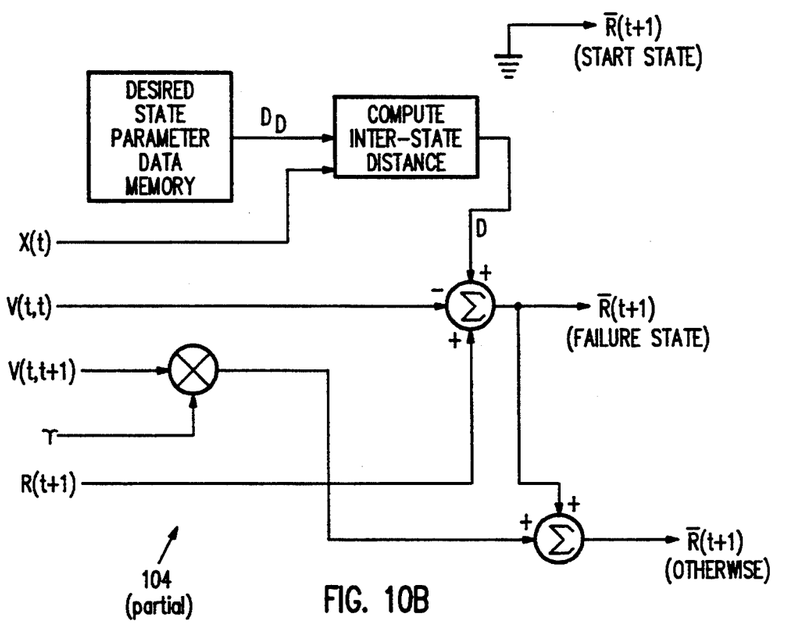
FIGS. 10B and 10C are functional block diagrams depicting the generating of the reinforcement signal and modified inter-neuron weights for the critic network of FIG. 7.
Figure 10C:
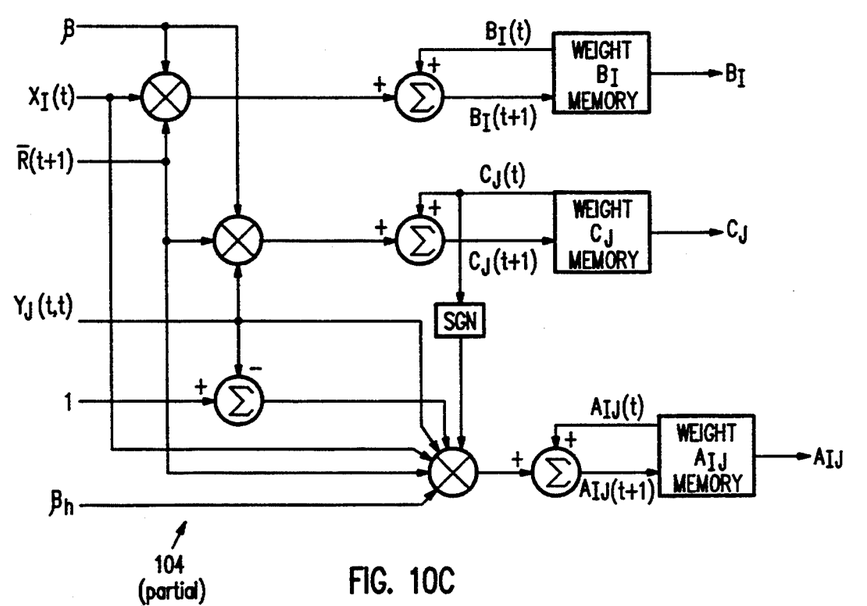

Referring to FIGS. 10A–10C, the critic network 104 (FIG. 1) includes a three-layer neural network with an input neuron layer 152, middle neuron layer 154 and output neuron layer 156 mutually coupled via interconnection weights $A_{IJ}$, $B_I$ and $C_J$, where $I \in \{1,2,3,\ldots,M\}$ and $J \in \{1,2,3,\ldots,N\}$. (It should be recognized that each of the artificial neurons represented in FIG. 10A can be implemented with a circuit similar to that shown in FIG. 9B.)

The interconnection, i.e. inter-neuron, weights $A_{IJ}$, $B_I$ and $C_J$ weight the plant state signal 110$a$ and produce the reinforcement signal 112 substantially in accordance with the following relationships:

$$V(t_1,t_2) = \sum_{I=1}^{M} B_I(t_1)X_I(t_2) + \sum_{J=1}^{N} C_J(t_1)Y_J(t_1,t_2)$$

where:

$$Y_J(t_1,t_2) = G\left[\sum_{I=1}^{M} A_{IJ}(t_1)X_I(t_2)\right]$$

$$G(s) = \frac{1}{1 + e^{-s}}$$

$B_I(t+1) = B_I(t) + \beta\bar{R}(t+1)X_I(t)$
$C_J(t+1) = C_J(t) + \beta\bar{R}(t+1)Y_J(t,t)$
$A_{IJ}(t+1) = A_{IJ}(t) + \beta_h\bar{R}(t+1)Y_J(t,t)[1 - Y_J(t,t)]sgn[C_J(t)]X_I(t)$
$sgn(X) = +1$ for positive "X"
 $= -1$ for negative "X"
$\bar{R}(t+1)$ = Reinforcement signal at time $t+1$ $$= \begin{cases} 0, \text{ if state at time } t+1 \text{ is a start state} \\ R(t+1) - V(t,t) - \alpha\Delta D, \text{ if state at time} \\ \quad t+1 \text{ is a failure state} \\ R(t+1) + \gamma V(t,t+1) - V(t,t) - \alpha\Delta D, \\ \quad \text{otherwise} \end{cases}$$

where:

$\Delta D = D(t+1) - D(t)$
$D(t)$ = "inter-state" distance, i.e. distance from (e.g. difference between) the actual performance parameter state vector $X(t)$ to a desired performance parameter state vector $D_D$
$\gamma$ = scaling factor
$0 < \gamma \leq 1$
$\alpha$ = scaling factor
$\beta$ = scaling factor
$\beta_h$ = scaling factor
$\beta, \beta_h > 0$ As will be recognized from the foregoing, the reinforcement signal $\bar{R}$, and thus the updated inter-neuron weights $A_{IJ}$, $B_J$ and $C_J$, are dependent upon a distance parameter D. This distance parameter D corresponds to a distance (e.g. Euclidean, Hamming or other type of distance) which represents a difference between the actual state (represented by the plant state signal 110a) and a desired state of the quantitative plant performance parameter.

As noted above, an action network 102 in accordance with the present invention can use fuzzy logic. Fuzzy sets, as opposed to "crisp" sets, are used which have multiple states in accordance with a membership function. Each element is a full or partial member of its respective set. Decisions are made in accordance with fuzzy rules, operations and relations, and the outcome of several fuzzy rules are converted back to numerical states by using "defuzzification."

To make the unsupervised learning faster and more effective, the action network 102, as mentioned above, can map its input signals 110b into fuzzy logic. Thus, expert knowledge can be incorporated into the action network 102. This incorporation of knowledge can be done by expressing the slope ($=W_{IJ}$) of a membership function $U_{IJ}(X)$ between the input 114 and middle 116 neuron layers as a function of a parameter $\bar{R}$ which is represented by the reinforcement signal 112.

With such representation, each weight $W_{IJ}$ associated with a middle layer neuron 116.J corresponds to an antecedent of a fuzzy rule. The outputs of the middle layer neurons 116.1–116.N represent the consequents, i.e. the outcome from the application of such fuzzy rules. These rules are then merged into final outputs using the output layer neurons 118.1–118.P.

Figure 11:
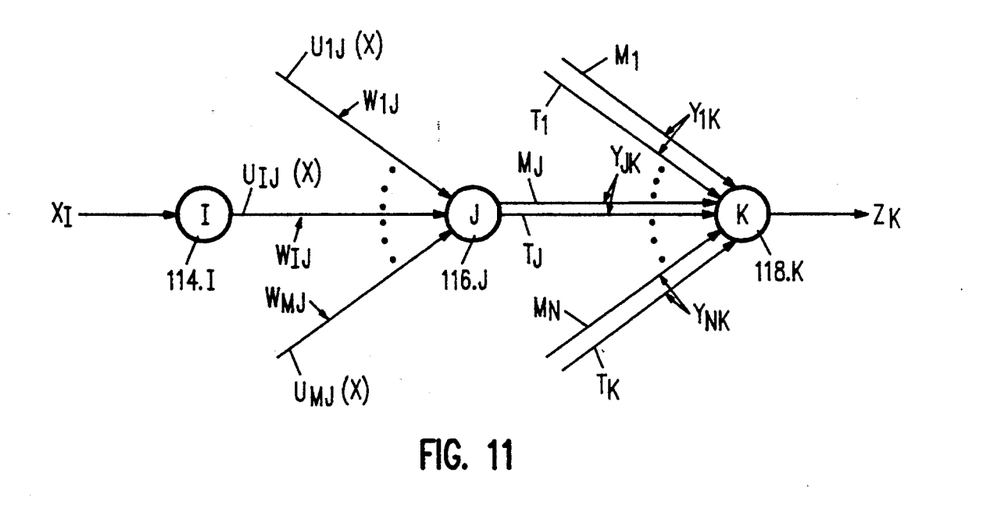
FIG. 11 is an alternative neural network model for a portion of the action network of FIG. 8A.

Referring to FIG. 11, a portion of the neural network configuration of FIG. 8B in accordance with an alternative embodiment of the present invention is illustrated in expanded form, showing only the "Ith", "Jth" and "Kth" neurons of the input, middle and output layers, respectively. Each input $X_I$ is "fuzzified" by its associated input neuron 114.I to produce a signal $U_{IJ}(X)$ which represents an associated membership function. Each middle layer neuron 116.J receives its input signals, which are the products of the signals $U_{1J}(X)$–$U_{MJ}(X)$ and their respective weights $W_{1J}$–$W_{MJ}$, and produces an output signal $T_J$ substantially in accordance with:

$$T_J = \text{MIN} \{W_{1J}U_{1J}(X), W_{2J}U_{2J}(X), W_{3J}U_{3J}(X), \ldots, W_{IJ}U_{IJ}(X), \ldots, W_{MJ}U_{MJ}(X)\}$$

The middle layer neuron 116.J also provides a second signal $M_J$ (representing the universe of discourse) associated with the first output signal $T_J$ in accordance with a membership function $U_{CJ}(M_J)$ substantially in accordance with:

$$T_J = U_{CJ}(M_J)$$

Each output layer neuron 118.K receives its inputs, which are the products of the signals $M_1$–$M_N$ and $T_1$–$T_N$ and their respective weights $Y_{1K}$–$Y_{NK}$, and produces a "defuzzified" output signal $Z_K$ substantially in accordance with:

$$Z_K = \sum_{J=1}^{N} Y_{JK}T_JM_J \Big/ \sum_{J=1}^{N} Y_{JK}T_J$$

Exemplary "fuzzy" sets A and B have membership functions $U_A(X)$ and $U_B(X)$, respectively, which, depending upon whether each set is "crisp" or "fuzzy," are defined as follows:

"Crisp" sets A & B:
$U_A(X) = 0$ or $1$
$U_B(x) = 0$ or $1$

"Fuzzy" sets A & B:
$0 \leq U_A(X) \leq 1$
$0 \leq U_B(x) \leq 1$

Figure 12:
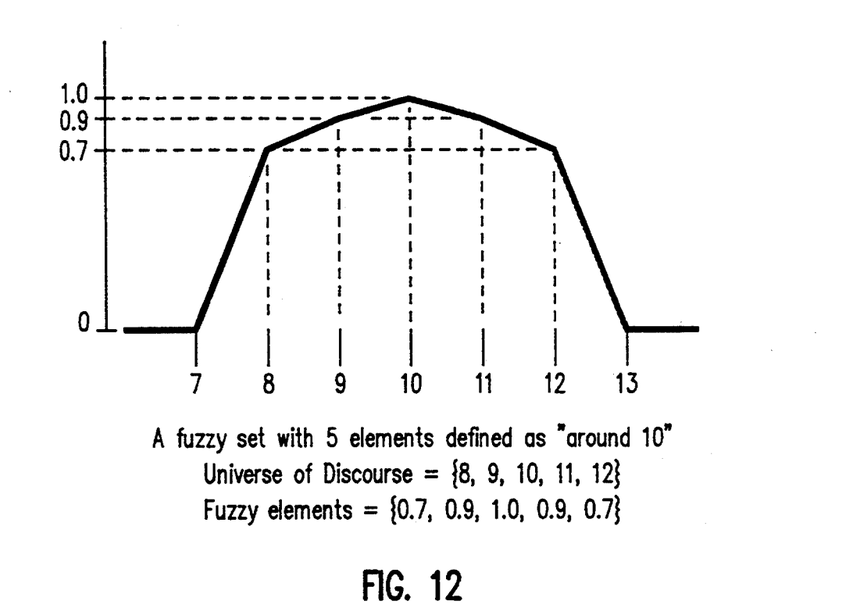
FIG. 12 is an exemplary representation of a "fuzzy" set.

Referring to FIG. 12, an exemplary "fuzzy" set having five elements defined as "around 10" is represented. The five elements are 0.7, 0.9, 1.0, 0.9 and 0.7 over the universe of discourse 8, 9, 10, 11 and 12 respectively. These elements can be operated upon using fuzzy logic operations or relations, as desired. For example, typical fuzzy logic operations can include the following:

| | | | |
|---|---|---|---|
| Union: | $A \cup B$ | = | $U(A \text{ OR } B)$ |
| | | = | $\text{MAX}[U_A(x), U_B(x)]$ |
| Intersection: | $A \cap B$ | = | $U(A \text{ AND } B)$ |
| | | = | $\text{MIN}[U_A(x), U_B(x)]$ |
| Complement: | $U(\bar{A})$ | = | $1 - U_A(x)$ |
| Implication: | $(A \rightarrow B)$ | = | $A \cup B$ |

Fuzzy logic elements can initially be defined in accordance with linguistic sets which specify possible, or desired, performance parameters or variations thereof. For example, a fuzzy control system for a robotic mechanism in accordance with the present invention can have linguistic sets and control rules as follows:

Linguistic Sets:
  LP = large positive
  MP = medium positive
  SP = small positive
  ZE = zero
  SN = small negative
  MN = medium negative
  LN = large negative Control Rules:
  (1) If error is ZE and error change is SP, then plant control input is SN.
  (2) If error is ZE and error change is ZE, then plant control input is ZE.
  (3) If error is SN and error change is SN, then plant control input is SP.
  (4) If error is SN and error change is ZE, then plant control input is LP.

Figure 13A:
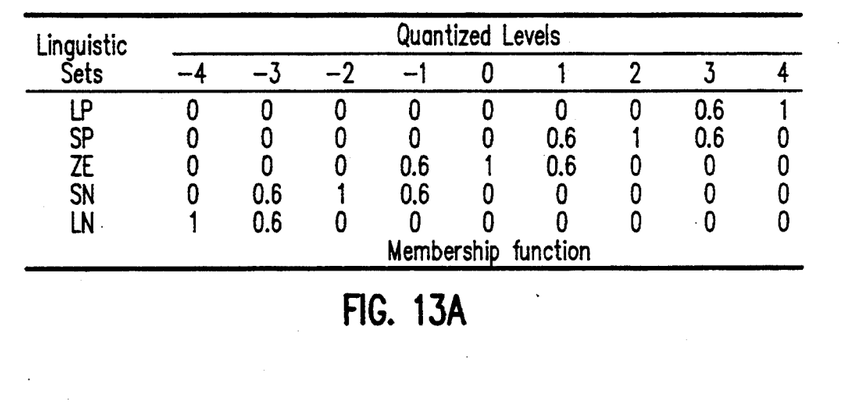
FIG. 13A is an exemplary quantization of a linguistic set representing the members of a "fuzzy" set.
Figure 13B:
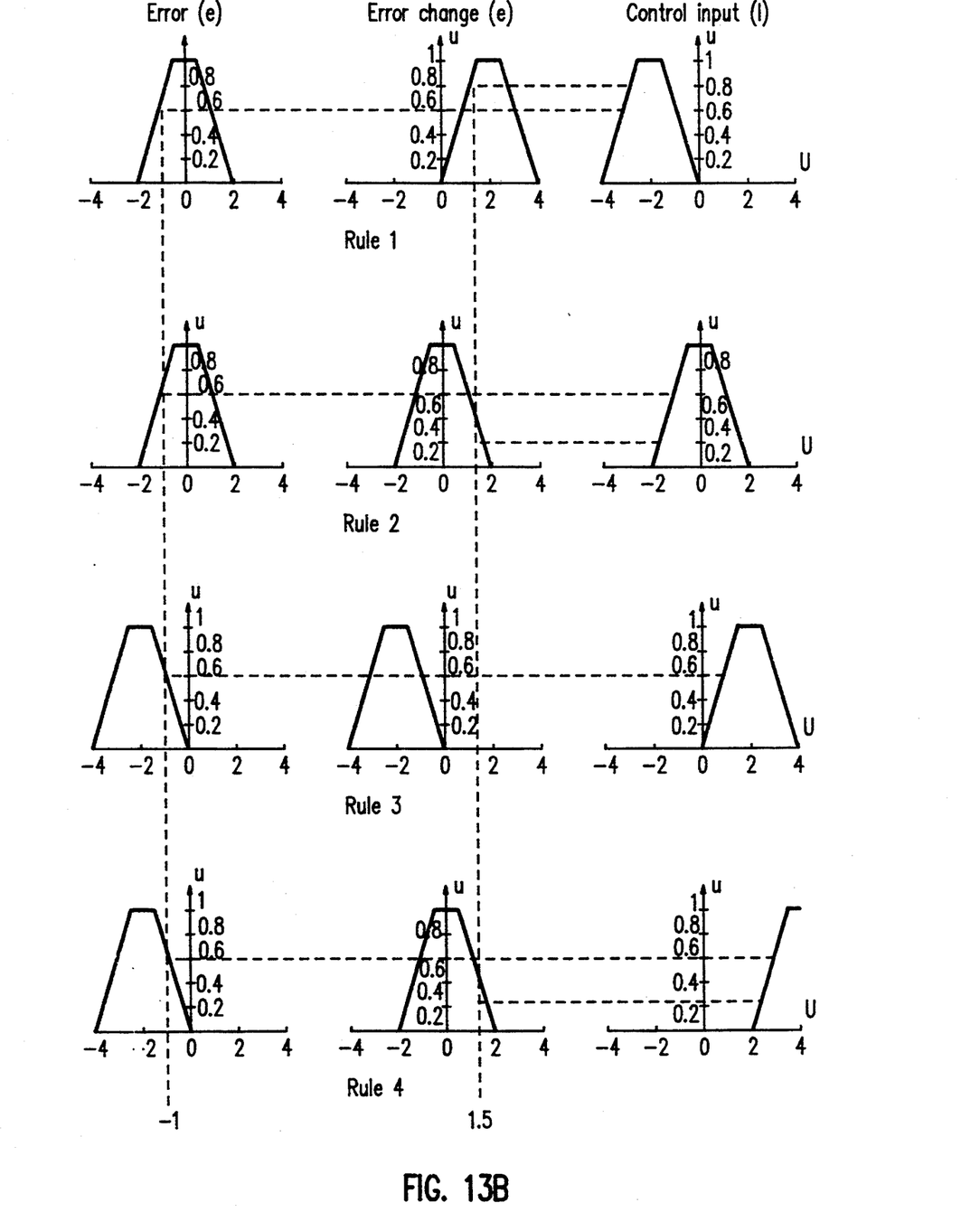
FIG. 13B is a graphical representation of a "fuzzy" logic operation results in accordance with exemplary "fuzzy" control rules.
Figure 13C:
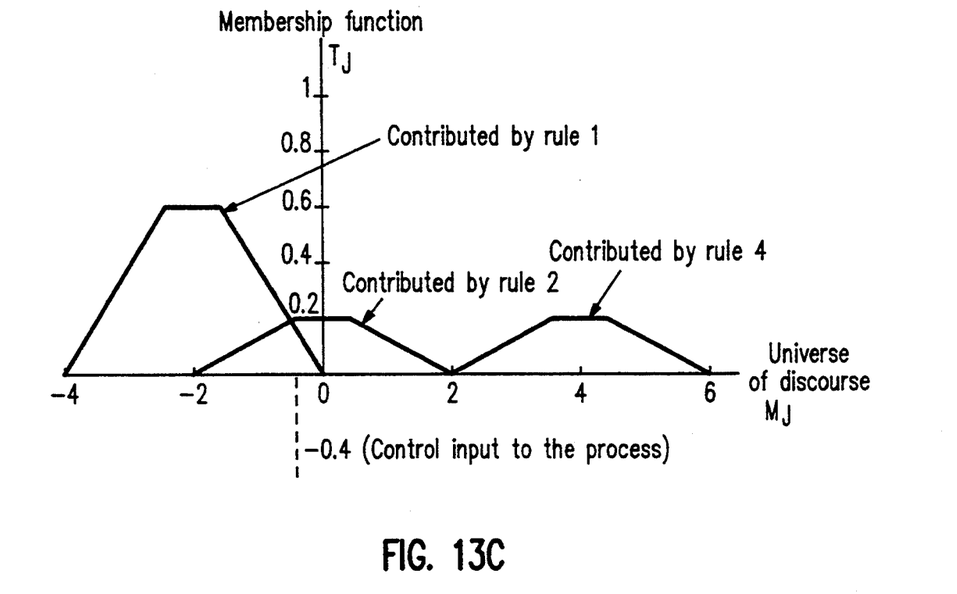
FIG. 13C is a graphical representation of "defuzzification" of "fuzzy" logic operation results in accordance with exemplary "fuzzy" control rules.

Referring to FIG. 13A, the elements of the foregoing linguistic sets can be quantized as shown. As shown in FIG. 13B, application of the four foregoing control rules to these quantized linguistic sets produces the plant control signals as shown. Referring to FIG. 13C, these four plant control signals can then be "defuzzified" according to a "center-of-gravity" method to produce a final state of −0.4 for the plant control signal 108.

It should be understood that various alternatives to the embodiments of the present invention described herein can be employed in practicing the present invention. It is intended that the following claims define the scope of the present invention, and that structures and methods within the scope of these claims and their equivalents be covered thereby.

What is claimed is:

1. A plant controller using reinforcement learning for controlling a plant by generating a control signal therefor, the plant controller comprising:

an action network for coupling to a plant and receiving therefrom a plant state signal, receiving a reinforcement signal and in accordance therewith generating a plant control signal, wherein the plant state signal represents an actual state of a quantitative plant performance parameter for the plant, the reinforcement signal represents a desired state of a performance control parameter for the action network, and the plant control signal represents a desired state of the quantitative plant performance parameter, and further wherein the plant control signal is generated in further accordance with unsupervised learning; and a critic network, coupled to the action network, for coupling to the plant and receiving therefrom the plant state signal and a plant performance signal and in accordance therewith outputting the reinforcement signal to the action network, wherein the plant performance signal represents a qualitative plant performance parameter for the plant.

2. A plant controller as recited in claim 1, wherein the action network generates a continuous plant control signal.

3. A plant controller as recited in claim 1, wherein the action network comprises an unsupervised learning based neural network.

4. A plant controller as recited in claim 3, wherein the unsupervised learning based neural network comprises first, second and third neuron layers with first and second pluralities of inter-neuron weights data stored in memory and associated therewith, and wherein the first and second pluralities of inter-neuron weights data are selectively modified in accordance with the reinforcement signal.

5. A plant controller as recited in claim 1, wherein the critic network comprises a neural network.

6. A plant controller as recited in claim 5, wherein the neural network comprises first, second and third neuron layers with first, second and third pluralities of inter-neuron weights data stored in memory and associated therewith, and wherein the first, second and third pluralities of inter-neuron weights data are selectively modified in accordance with the plant performance signal.

7. A plant controller using reinforcement learning for controlling a plant by generating a control signal therefor, the plant controller comprising:

an action network for coupling to a plant and receiving therefrom a plant state signal, receiving a reinforcement signal and in accordance therewith generating a plant control signal, wherein the plant state signal represents an actual state of a quantitative plant performance parameter for the plant, the reinforcement signal represents a desired state of a performance control parameter for the action network, and the plant control signal represents a desired state of the quantitative plant performance parameter; and a critic network, coupled to the action network, for coupling to the plant and receiving therefrom the plant state signal and a plant performance signal and in accordance therewith outputting the reinforcement signal to the action network, wherein the plant performance signal represents a qualitative plant performance parameter for the plant, and further wherein the reinforcement signal is outputted in further accordance with a distance parameter which represents a difference between the actual and desired states of the quantitative plant performance parameter.

8. A plant controller as recited in claim 7, wherein the action network generates a continuous plant control signal.

9. A plant controller as recited in claim 7, wherein the action network comprises a neural network.

10. A plant controller as recited in claim 9, wherein the neural network comprises first, second and third neuron layers with first and second pluralities of inter-neuron weights data stored in memory and associated therewith, and wherein the first and second pluralities of inter-neuron weights data are selectively modified in accordance with the reinforcement signal.

11. A plant controller as recited in claim 9, wherein the critic network comprises a neural network.

12. A plant controller as recited in claim 11, wherein the neural network comprises first, second and third neuron layers with first, second and third pluralities of inter-neuron weights data stored in memory and associated therewith, and wherein the first, second and third pluralities of inter-neuron weights data are selectively modified in accordance with the plant performance signal.

13. A plant control method using reinforcement learning for controlling a plant by generating a control signal therefor, comprising the steps of:

receiving a plant state signal and a plant performance signal from a plant, wherein the plant state signal represents an actual state of a quantitative plant performance parameter for the plant and the plant performance signal represents a qualitative plant performance parameter for the plant;

generating a reinforcement signal in accordance with the plant state signal and the plant performance signal, wherein the reinforcement signal represents a desired state of a performance control parameter;

receiving the reinforcement signal; and generating a plant control signal in accordance with the plant state signal and the reinforcement signal and in further accordance with unsupervised learning, wherein the plant control signal represents a desired state of the quantitative plant performance parameter.

14. A plant control method as recited in claim 13, wherein the step of generating the plant control signal in accordance with the plant state signal and the reinforcement signal comprises generating a continuous plant control signal.

15. A plant control method as recited in claim 13, wherein the step of generating the plant control signal in accordance with the plant state signal and the reinforcement signal comprises generating the plant control signal with an unsupervised learning based neural network which includes first and second pluralities of inter-neuron weights data associated therewith.

16. A plant control method as recited in claim 15, wherein the step of generating the plant control signal with an unsupervised learning based neural network comprises selectively modifying the first and second pluralities of inter-neuron weights data in accordance with the reinforcement signal.

17. A plant control method as recited in claim 13, wherein the step of generating the reinforcement signal in accordance with the plant state signal and the plant performance signal comprises generating the reinforcement signal with a neural network.

18. A plant control method as recited in claim 17, wherein the step of generating the reinforcement signal with a neural network comprises selectively modifying first, second and third pluralities of inter-neuron weights data in accordance with the plant performance signal.

19. A plant control method using reinforcement learning for controlling a plant by generating a control signal therefor, comprising the steps of:

receiving a plant state signal and a plant performance signal from a plant, wherein the plant state signal represents an actual state of a quantitative plant performance parameter for the plant and the plant performance signal represents a qualitative plant performance parameter for the plant, generating a reinforcement signal in accordance with the plant state signal and the plant performance signal and in further accordance with a distance parameter which represents a difference between the actual state and a desired state of the quantitative plant performance parameter, wherein the reinforcement signal represents a desired state of a performance control parameter;

receiving the reinforcement signal; and generating a plant control signal in accordance with the plant state signal and the reinforcement signal, wherein the plant control signal represents the desired state of the quantitative plant performance parameter.

20. A plant control method as recited in claim 19, wherein the step of generating the plant control signal in accordance with the plant state signal and the reinforcement signal comprises generating a continuous plant control signal.

21. A plant control method as recited in claim 19, wherein the step of generating the plant control signal in accordance with the plant state signal and the reinforcement signal comprises generating the plant control signal with a neural network which includes first and second pluralities of inter-neuron weights data associated therewith.

22. A plant control method as recited in claim 21, wherein the step of generating the plant control signal with a neural network comprises selectively modifying the first and second pluralities of inter-neuron weights data in accordance with the reinforcement signal.

23. A plant control method as recited in claim 19, wherein the step of generating the reinforcement signal in accordance with the plant state signal and the plant performance signal comprises generating the reinforcement signal with a neural network.

24. A plant control method as recited in claim 23, wherein the step of generating the reinforcement signal with a neural network comprises selectively modifying first, second and third pluralities of inter-neuron weights data in accordance with the plant performance signal.

25. A plant controller using reinforcement learning for controlling a plant by generating a control signal therefor, the plant controller comprising:

an action network for coupling to a plant and receiving therefrom a plant state signal, receiving a reinforcement signal and in accordance therewith generating a plant control signal, wherein the plant state signal represents an actual state of a quantitative plant performance parameter for the plant, the reinforcement signal represents a desired state of a performance control parameter for the action network, and the plant control signal represents a desired state of the quantitative plant performance parameter, and wherein the plant control signal is generated in further accordance with unsupervised learning, and further wherein the action network comprises an unsupervised learning based neural network, and still further wherein the unsupervised learning based neural network is configured to perform Kohonen feature mapping; and a critic network, coupled to the action network, for coupling to the plant and receiving therefrom the plant state signal and a plant performance signal and in accordance therewith outputting the reinforcement signal to the action network, wherein the plant performance signal represents a qualitative plant performance parameter for the plant.

26. A plant controller using reinforcement learning for controlling a plant by generating a control signal therefor, the plant controller comprising:

an action network for coupling to a plant and receiving therefrom a plant state signal, receiving a reinforcement signal and in accordance therewith generating a plant control signal, wherein the plant state signal represents an actual state of a quantitative plant performance parameter for the plant, the reinforcement signal represents a desired state of a performance control parameter for the action network, and the plant control signal represents a desired state of the quantitative plant performance parameter, and wherein the plant control signal is generated in further accordance with unsupervised learning, and further wherein the action network generates the plant control signal in still further accordance with a plurality of fuzzy logic rules; and a critic network, coupled to the action network, for coupling to the plant and receiving therefrom the plant state signal and a plant performance signal and in accordance therewith outputting the reinforcement signal to the action network, wherein the plant performance signal represents a qualitative plant performance parameter for the plant.

27. A plant controller using reinforcement learning for controlling a plant by generating a control signal therefor, the plant controller comprising:

an action network for coupling to a plant and receiving therefrom a plant state signal, receiving a reinforcement signal and in accordance therewith generating a plant control signal, wherein the plant state signal represents an actual state of a quantitative plant performance parameter for the plant, the reinforcement signal represents a desired state of a performance control parameter for the action network, and the plant control signal represents a desired state of the quantitative plant performance parameter, and wherein the action network comprises a neural network, and further wherein the neural network is configured to perform Kohonen feature mapping; and a critic network, coupled to the action network, for coupling to the plant and receiving therefrom the plant state signal and a plant performance signal and in accordance therewith outputting the reinforcement signal to the action network, wherein, the plant performance signal represents a qualitative plant performance parameter for the plant, and further wherein the reinforcement signal is outputted in further accordance with a distance parameter which represents a difference between the actual and desired states of the quantitative plant performance parameter.

28. A plant controller using reinforcement learning for controlling a plant by generating a control signal therefor, the plant controller comprising:
an action network for coupling to a plant and receiving therefrom a plant state signal, receiving a reinforcement signal and in accordance therewith generating a plant control signal, wherein the plant state signal represents an actual state of a quantitative plant performance parameter for the plant, the reinforcement signal represents a desired state of a performance control parameter for the action network, and the plant control signal represents a desired state of the quantitative plant performance parameter, and wherein the action network generates the plant control signal in still further accordance with a plurality of fuzzy logic rules; and
a critic network, coupled to the action network, for coupling to the plant and receiving therefrom the plant state signal and a plant performance signal and in accordance therewith outputting the reinforcement signal to the action network, wherein the plant performance signal represents a qualitative plant performance parameter for the plant, and further wherein the reinforcement signal is outputted in further accordance with a distance parameter which represents a difference between the actual and desired states of the quantitative plant performance parameter.

29. A plant control method using reinforcement learning for controlling a plant by generating a control signal therefor, comprising the steps of:
receiving a plant state signal and a plant performance signal from a plant, wherein the plant state signal represents an actual state of a quantitative plant performance parameter for the plant and the plant performance signal represents a qualitative plant performance parameter for the plant;
generating a reinforcement signal in accordance with the plant state signal and the plant performance signal, wherein the reinforcement signal represents a desired state of a performance control parameter;
receiving the reinforcement signal; and
generating a plant control signal in accordance with the plant state signal and the reinforcement signal and in further accordance with unsupervised learning and Kohonen feature mapping with an unsupervised learning based neural network which includes first and second pluralities of inter-neuron weights data associated therewith, wherein the plant control signal represents a desired state of the quantitative plant performance parameter.

30. A plant control method using reinforcement learning for controlling a plant by generating a control signal therefor, comprising the steps of:
receiving a plant state signal and a plant performance signal from a plant, wherein the plant state signal represents an actual state of a quantitative plant performance parameter for the plant and the plant performance signal represents a qualitative plant performance parameter for the plant;
generating a reinforcement signal in accordance with the plant state signal and the plant performance signal, wherein the reinforcement signal represents a desired state of a performance control parameter;
receiving the reinforcement signal; and
generating a plant control signal in accordance with the plant state signal and the reinforcement signal and in further accordance with unsupervised learning and in still further accordance with a plurality of fuzzy logic rules, wherein the plant control signal represents a desired state of the quantitative plant performance parameter.

31. A plant control method using reinforcement learning for controlling a plant by generating a control signal therefor, comprising the steps of:
receiving a plant state signal and a plant performance signal from a plant, wherein the plant state signal represents an actual state of a quantitative plant performance parameter for the plant and the plant performance signal represents a qualitative plant performance parameter for the plant,
generating a reinforcement signal in accordance with the plant state signal and the plant performance signal and in further accordance with a distance parameter which represents a difference between the actual state and a desired state of the quantitative plant performance parameter, wherein the reinforcement signal represents a desired state of a performance control parameter;
receiving the reinforcement signal; and
generating a plant control signal in accordance with the plant state signal, the reinforcement signal and Kohonen feature mapping with a neural network which includes first and second pluralities of inter-neuron weights data associated therewith, wherein the plant control signal represents the desired state of the quantitative plant performance parameter.

32. A plant control method using reinforcement learning for controlling a plant by generating a control signal therefor, comprising the steps of:
receiving a plant state signal and a plant performance signal from a plant, wherein the plant state signal represents an actual state of a quantitative plant performance parameter for the plant and the plant performance signal represents a qualitative plant performance parameter for the plant,
generating a reinforcement signal in accordance with the plant state signal and the plant performance signal and in further accordance with a distance parameter which represents a difference between the actual state and a desired state of the quantitative plant performance parameter, wherein the reinforcement signal represents a desired state of a performance control parameter;
receiving the reinforcement signal; and
generating a plant control signal in accordance with the plant state signal, the reinforcement signal and a plurality of fuzzy logic rules, wherein the plant control signal represents the desired state of the quantitative plant performance parameter.

* * * * *